Aug. 7, 1923.
T. C. LAZIER
1,464,323
DRYING APPARATUS FOR LUMBER
Original Filed Sept. 27, 1919   2 Sheets-Sheet 2
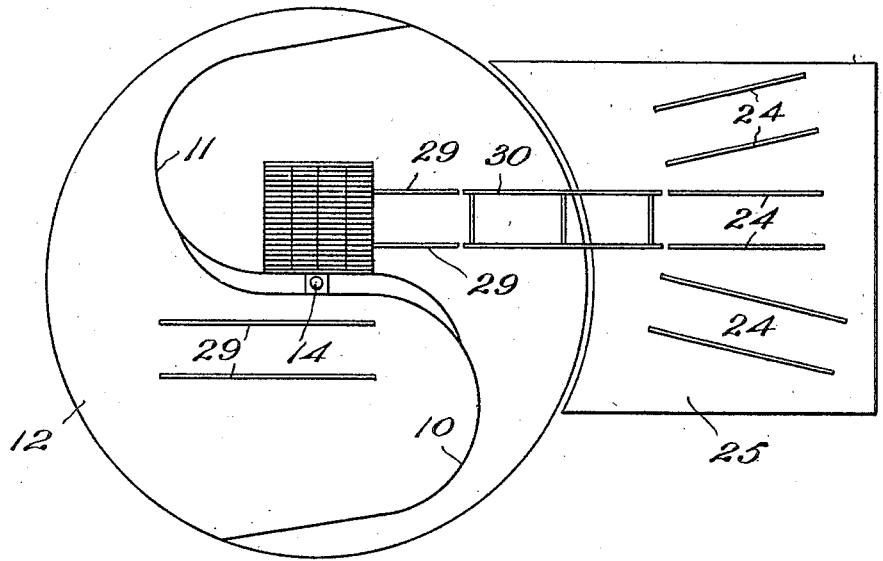
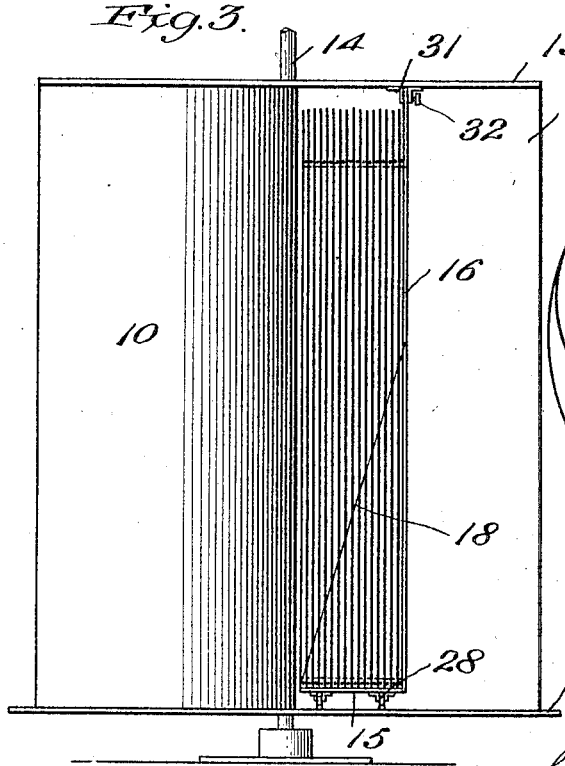
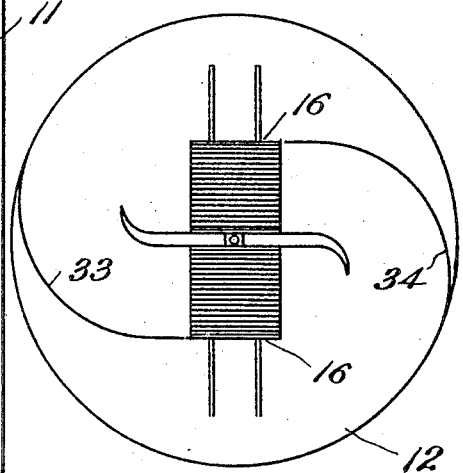
Thomas C. Lazier
Inventor
By his Attorney Patented Aug. 7, 1923.                                             1,464,323

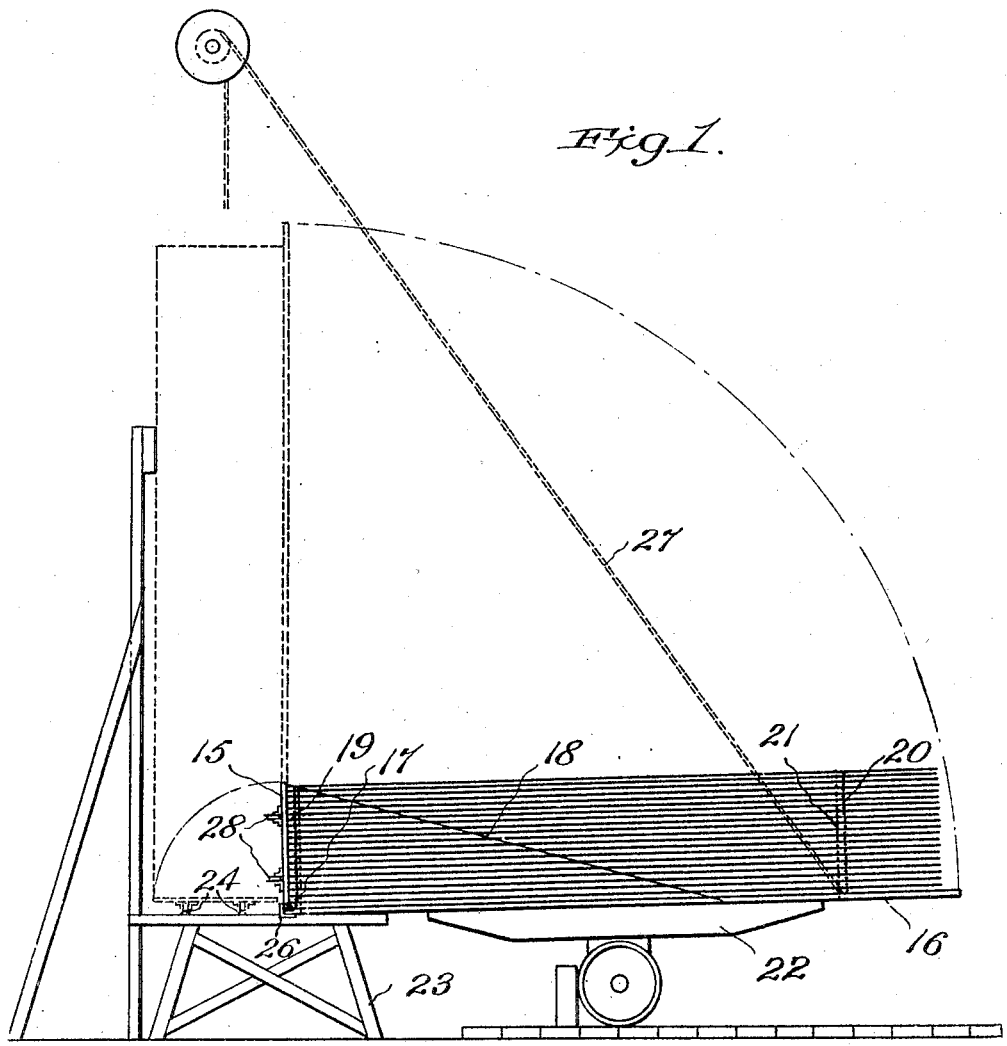

UNITED STATES PATENT OFFICE.

THOMAS C. LAZIER, OF BELLEVILLE, CANADA, ASSIGNOR, BY MESNE ASSIGNMENTS, TO NATURAL AIR DRYERS, INC., A CORPORATION OF DELAWARE.

DRYING APPARATUS FOR LUMBER.

Application filed September 27, 1919, Serial No. 326,798. Renewed January 13, 1923.

*To all whom it may concern:*

Be it known that I, THOMAS C. LAZIER, a citizen of the Dominion of Canada, residing in the city of Belleville, Canada, have invented a certain Improvement in Drying Apparatus for Lumber, of which the following is a specification.

My present invention relates to an improvement in the rotary compressed-draft-producing type of drier invented by Seymour W. Bonsall of New York city and best exemplified in his United States Patent Number 1,047,734, dated December 17th, 1912; and the principal object of the invention is the provision of apparatus whereby the loading and unloading of driers of this general type is greatly facilitated. In the following specification, I have described the invention in connection with its application to the drying of heavy lumber, such as planking, but I do not limit myself to this application of the invention.

In the accompanying drawings, Figure 1 is a side view of a loaded container about to be set up on the stationary track, Figure 2 is a diagrammatic plan view of the preferred drier and loading platform, the top of the drier being removed to show the removable container in place, Figure 3 is an elevation, showing the loaded container in place in the preferred drier, and Figure 4 is a diagrammatic plan view showing the container as used in a modified form of drier.

Figures 2 and 3 show in diagram, with sufficient clearness for present purposes, the principal features of the preferred drier as modified in conformity with my invention.

At 10 and 11 are shown two thin walls extending from the bottom or floor 12 to the roof 13, which walls merge into each other near the shaft 14, upon which the drier is adapted to revolve, as described in the patent to Bonsall aforesaid. These walls, viewed in transverse section, as in Figure 2, form a reversed curve resembling the letter S, and, when the drier is revolved clockwise in Figure 2, the outer portions or wings of the two walls act to scoop the air inward, causing a reverse current on the side of each scoop which is nearer the center.

As fully described in the Bonsall patent aforesaid, this interior reversed current is made available for the drying of material within a container located near the center of revolution. This material is arranged to provide passages whose aggregate area is much less than the area of the scoop outside of the container. The consequence is that the air is compressed and acts, as explained in the patent, to carry off moisture by an exhausting effect exerted at the external orifices or pores of the capillaries, of a nature familiar in machines for exhausting electric lamp bulbs and in other connections.

In order to guide and confine this compressed draft, it is necessary that a confining wall shall exist, outside of the container holding the material to be dried and separating the incoming current from the outgoing reversed and compressed current of air. My improvement involves the use of a separable transporting container having a loading floor adapted to serve as a confining and separating wall of this character, and capable of being removed and changed in convenient loading position; after which it can be replaced, fully loaded, and will form an essential element of the drier itself.

In order thoroughly to make clear the nature and advantages of the invention, I shall proceed to describe the preferred loading operation which leads up to the production of the completed drier, made complete by the process of charging with the material to be treated, in this instance boards or planking.

The transporting-container comprises a supporting floor 15, intended to support the planking on end during the drying operation, and a loading floor 16 which becomes the separating wall of the drier during operation, and acts to separate the inflowing from the reversed outgoing compressed current. For convenience in stowing, I prefer to hinge these floors together at 17, securing them in operative position by means of braces, as indicated at 18.

As the boards come from the sawmill they are laid flat along the floor 16, preferably four abreast, their ends abutting upon the supporting floor 15. The first layer of boards rests upon thin transverse spacing devices, such as wooden rods whose ends are shown at 19 and 20 and similar spacing devices separate each layer of boards from the next.

When the pile of boards is as sigh as the depth of the floor 15, as shown in Figure 1, chains or other binding means 21 are secured around the boards and the loading floor 16, thus producing a firmly secured package in which layers of board, separated by narrow continuous spaces, are held parallel to the floor 16.

During the loading operation, the transporting-container lies upon a car 22, and, when the loading is accomplished, this car is rolled up to a trestle 23, carrying a track 24, leading to the loading platform 25 shown in Figure 2. As indicated in this figure, a number of such tracks may be made to converge upon the platform 25.

The corner 17 of the container having been brought up against a stop 26 on the trestle, the container is then tilted into upright position, as indicated in dotted lines in Figure 1 by means of a derrick chain 27 or otherwise. In this position, the wheels 28 on the floor 15 come down upon the tracks 24, after which the whole may be rolled forward to the loading platform.

The drier is turned until the track section 29 on the floor 12 is in line with the particular track 24 carrying the container with which it is then connected by a bridging track section 30, so that the container can be rolled onto the track section 29, into operative position, as shown in Figures 2 and 3. Here the container may be secured in any suitable manner, but, in order to confine the air current at the top of the container, I prefer to provide straight securing guides 31 under the roof 13, affording a groove into which the top of the floor 16 is made to slide as shown in Figure 3. Set screws 32 may be used to fix the edge of the floor 16 firmly within this groove, and to produce substantially air-tight contact at this point. After one side of the drier is thus made complete and operative, the opposite side is turned into position to receive a second loaded container from any one of the tracks on the loading platform.

When the drier has been thus completed and loaded, the bridging track section is removed, and the drying operation can then be begun by rotation of the drier in the manner set forth in the Bonsall patent aforesaid.

In the apparatus thus far described, the transporting container is combined with air scoops in such a manner that the air current is completely reversed in direction on each side of the center of revolution. My present invention, however, may be adapted to a modified form of drier set forth and claimed in my application for patent filed simultaneously herewith, Serial No. 326,797 wherein the air which is scooped in at one side of the center is ejected at the opposite side, without complete reversal.

Figure 4 shows this in diagram, the opposed air scoops being shown at 33 and 34. In this case, the loading floor 16 forms the continuation of a scooping wall on each side, and the boards instead of approaching the drier edgewise, lie transversely to the path of approach. It will be seen that, both in the arrangement shown in Figures 2 and 3 and in that shown in Figure 4, the upright floor 16 forms a confining wall for the compressed air current.

Various changes can be made in my apparatus without departing from the scope of my invention, and I do not limit myself to the details herein shown and described.

What I claim is:

1. A pair of balanced air scoops and a mounting therefor adapted to permit them to revolve about a center; in combination with a removable loading-container for each scoop; each container comprising a supporting floor and a side wall adapted, when the container is in place, to confine the air current created by the operation of its respective air scoop.

2. Apparatus of the general character set forth in claim 1 hereof, wherein each removable transporting-container is placed near the center of revolution and between it and the outer edge of the scoop which supplies it with air current.

3. Apparatus of the general character set forth in claim 1 hereof, wherein the containers have wheels standing upon tracks on the drier floor combined with a stationary loading platform having tracks, and a bridging track section adapted to connect the tracks within the scoops with those on the platform.

4. Apparatus of the general character set forth in claim 1 hereof, wherein the two parts of the container are hinged together and wherein detachable braces are provided for holding the floor and wall in operative position.

5. Apparatus of the general character set forth in claim 1 hereof, wherein air-confining means are provided at the top of each scoop adapted to receive and confine the top edge of each upright container wall.

In testimony whereof I have hereto set my hand on this 23rd day of September, 1919.

THOMAS C. LAZIER.